(12) United States Patent
Cremer et al.

(10) Patent No.: US 8,673,381 B2
(45) Date of Patent: Mar. 18, 2014

(54) FREE FLOWING VEGETABLE POWDER AND METHOD FOR ITS MANUFACTURE

(75) Inventors: Brenda K. Cremer, Salem, OR (US); Henry K. Leung, Plano, TX (US); Bridget Manis, Frisco, TX (US); Kelly S. Miller, The Colony, TX (US); Jason T. Niermann, Frisco, TX (US); Timothy F. Root, Medford, OR (US); Mark W. Sheppard, Oregon City, OR (US); Jim Stalder, Dallas, TX (US); Jo Ellen Wayne, Tualatin, OR (US)

(73) Assignee: Pacific Pure-Aid Company, Silverton, OR (US)

( * ) Notice: Subject to any disclaimer, the term of this patent is extended or adjusted under 35 U.S.C. 154(b) by 1800 days.

(21) Appl. No.: 11/700,009

(22) Filed: Jan. 31, 2007

(65) Prior Publication Data

US 2008/0182006 A1    Jul. 31, 2008

(51) Int. Cl.
*A23B 4/03* (2006.01)
*A23B 4/044* (2006.01)
*A23K 1/00* (2006.01)
*A23L 1/212* (2006.01)
*A23L 1/223* (2006.01)
*A23B 7/022* (2006.01)

(52) U.S. Cl.
USPC ............ 426/473; 426/615; 426/638; 426/640

(58) Field of Classification Search
USPC ......... 426/615, 638, 640, 628, 629, 443, 456, 426/464, 465, 473
See application file for complete search history.

(56) References Cited

U.S. PATENT DOCUMENTS

| 5,264,238 A * | 11/1993 | Taga et al. | 426/640 |
| 2004/0052916 A1* | 3/2004 | Ree | 426/549 |
| 2006/0093706 A1* | 5/2006 | Makino | 426/72 |

FOREIGN PATENT DOCUMENTS

WO    WO 2005000028 A1 *    1/2005

\* cited by examiner

*Primary Examiner* — Humera Sheikh
*Assistant Examiner* — Tynesha McClain-Coleman
(74) *Attorney, Agent, or Firm* — Young & Thompson

(57) ABSTRACT

A free flowing vegetable powder comprises an intimate mixture of at least three different dehydrated vegetables including:
- 5-60% of onion by weight of vegetable dry matter;
- 20-90% by weight of vegetable dry matter of moderately colored vegetable selected from the group consisting of vegetables belonging to the genus *Cucurbita*, vegetables belonging to the genus *Oleracea*, sweet corn, sweet potato, green bean, edamame, celery and combinations thereof; and
- 5-75% by weight of vegetable dry matter of intensely colored vegetable selected from the group consisting of tomato, red bell pepper, red beet, radicchio, swiss chard, rhubarb, peppers, yam, Adzuki beans, carrot, green pea, green bell pepper, asparagus, spinach, Brussels sprouts, kale, egg plant and combinations thereof. The vegetable powder according to the present invention can advantageously be employed in fabricated savory snacks to deliver nutritional benefit, a considerable vegetable serving size, color and taste.

4 Claims, No Drawings

FREE FLOWING VEGETABLE POWDER AND METHOD FOR ITS MANUFACTURE

TECHNICAL FIELD OF THE INVENTION

The present invention relates to free flowing vegetable powders that may suitably be applied in fabricated savory snacks, notably snacks that are produced by baking or frying a farinaceous dough composition. The vegetable powders of the present invention offer the advantage that they are storage stable, easy to handle and in that are instantly hydratable. Furthermore, the present vegetable powders can advantageously be applied in fabricated savory snacks to simultaneously deliver nutritional benefits, natural color and mild taste. The vegetable powders of the present invention are designed to be used as a major ingredient in fabricated snack products in order to a deliver high level of vegetable in a the final product, e.g. at least ⅓ serving of vegetables per ounce serving of snack product.

The present invention also provides a method for producing the free flowing vegetable powder of the present invention.

BACKGROUND OF THE INVENTION

Fabricated savory snack items include a wide variety of food products including chips, puffed dough articles and crackers. Processed snack foods are generally provided to the consumer in a ready-to-eat form. Food snacks are generally eaten separately from regular meals or used to supplement a meal.

Snacks such as potato crisps, corn chips and tortilla chips are particularly popular consumer snack products. In the case of farinaceous snacks, starch-based materials such as potato flakes are commonly reconstituted to form a dough sheet and then pieces are fabricated therefrom. These fabricated pieces are then immersed in a frying fat or oil or baked in an oven or an extruder.

It is well-known in the art of snacks manufacture to apply a seasoning onto farinaceous snacks in order to add modify the taste and/or appearance of the snack product. Besides spices, herbs and flavors also vegetables such as onion, red bell pepper and tomato have been incorporated in savory snack products as an ingredient of a seasoning mix that is applied onto the surface of the snack product.

It is also known to incorporate vegetables into fabricated snacks products. U.S. Pat. No. 5,264,238, for instance, describes a method for manufacturing a snack food comprising the steps of preparing the paste of a ground or pulverized natural ingredient selected from the group consisting of vegetables, fruits, beans and seaweeds, and then drying the paste to give a snack food having a moisture content ranging from 1 to 6% by weight and a bulk density ranging from 0.3 to 0.8 g/ml. The examples of the US patent describe the manufacture of snack products containing appreciable levels of a single vegetable, e.g. spinach, onion or carrot.

U.S. Pat. No. 5,110,613 describes a process for preparing snack chips comprising the steps of:
(a) mixing a starch material with water to form moist starch agglomerates comprising from about 25% to about 55% water by weight;
(b) mixing the moist starch agglomerates with a dry starch material containing not more than about 20% water by weight to form an agglomerate/starch composite;
(c) forming the agglomerate/starch composite into chip-like pieces; and
(d) cooking the pieces until they are crisp, wherein the cooking process is selected from the group consisting of baking, frying, and combinations thereof.

It is observed in the US patent that, if desired, up to 9% by weight, preferably 2% to 6% by weight, of the dry starch material can be replaced by non-potato food pieces which include, but are not limited to, parsley; chives, garlic or garlic skins; white, red, green, or yellow onions or onion skins; tomatoes or tomato skins; carrots; dill; broccoli; red or green peppers or pepper skins; or mixtures thereof. It is further said that the non-potato food pieces may be of any shape, but that it is preferable that the pieces have the dimensions of between 0.002-0.500 inch (0.005-1.27 cm). According to the US patent adding these ingredients can improve the taste, appearance and texture of the snack chips. They can also aid in the escape of steam from the dry portions of the snack chips during cooking, thereby preventing puffing and promoting a crunchy texture.

Although at present a large variety of fabricated snack products can be found on the supermarket shelves, there is a need for new snack products, notably snack products that outperform the existing snack products in terms of nutritional profile and that in terms of taste, appearance and texture are at least as good as existing snacks. In addition, there is a need for snack products that do not contain artificial coloring and/or artificial flavoring.

SUMMARY OF THE INVENTION

The present inventors have found that the aforementioned objectives may be met by incorporating into fabricated savory snack products a substantial amount of a free flowing vegetable powder that has been compounded to deliver nutritionally beneficial vegetable components, such as dietary fiber, carotenoids, anthocyans, flavonoids, vitamins and minerals; natural color; mild pleasant taste and a large serving of vegetables.

After extensive experimentation, the inventors have discovered that the aforementioned combination of benefits can be delivered by a vegetable powder that comprises an intimate mixture of at least three different dehydrated vegetables, said at least three vegetables including:
  5-60% of onion by weight of vegetable dry matter;
  20-90% by weight of vegetable dry matter of moderately colored vegetable selected from the group consisting of vegetables belonging to the genus *Cucurbita*, vegetables belonging to the genus *Oleracea*, sweet corn, sweet potato, green bean, edamame, celery and combinations thereof; and
  5-75% by weight of vegetable dry matter of intensely colored vegetable selected from the group consisting of tomato, red bell pepper, red beet, radicchio, swiss chard, rhubarb, peppers, yam, Adzuki beans, carrot, green pea, green bell pepper, asparagus, spinach, Brussels sprouts, kale, egg plant and combinations thereof;

In the vegetable powder of the present invention the onion component provides nutritionally beneficial components (e.g. dietary fiber, quercetin, vitamin C, vitamin B6, chromium, manganese and organosulfur compounds that have been linked to lowering of blood pressure and cholesterol levels). Furthermore, because the color of onion is a shade of white, onion can be used in the vegetable powder to control color intensity. Also the moderately colored and intensely vegetable component provide nutritionally beneficial components as well as natural color.

The specific combination of vegetables employed in accordance with the present invention enables the preparation of vegetable powders having a variety of color hues such as yellow, orange, red, pink, green and purple. The relative amounts in which the three mentioned vegetable components are contained in the present vegetable powder have been carefully selected to deliver an optimum combination of nutritional benefit, vegetable serving size, color and taste. As regards taste, the vegetable powder of the present invention was optimized to achieve a relatively bland taste. As a result, the present vegetable powder can suitably be used in a wide variety of fabricated savory snacks.

The nutritional value of commercially available fabricated savory snacks is largely determined by the potato, cereal and rice solids contained therein. Potato and cereal solids, e.g. potato flakes, wheat flour, oat flour and starch, as well as rice solids typically represent a major part of the solids contained in fabricated savory snacks. The vegetable powder of the present invention can advantageously be used to replace at least a part of the aforementioned ingredients. From a nutritional perspective (partial) substitution of potato or cereal solids with the present vegetable powder enhances nutritional value as the vegetables employed in the present vegetable powder contain significant levels of a variety of nutritionally beneficial components that are scarce in potato and cereals. Examples of such nutritionally beneficial ingredients that can be provided by the present vegetable powder include dietary fiber, carotenoids (e.g. β-carotene, lycopene, lutein), anthocyans, flavonoids (e.g. quercetin), vitamins (e.g. folate, vitamins A, B, C and D), minerals (e.g. iron, calcium, manganese, molybdenum, copper, potassium, phosphorus).

The present vegetable powder offers the additional advantage that it can be applied in snack products to deliver a large serving size of vegetables without adversely affecting product features such as texture, taste or appearance. The combination of vegetables employed in accordance with the present invention can suitably be used to deliver relatively high serving sizes of vegetable in the final snack product because a substantial fraction of the vegetable solids in the present vegetable powder consists of vegetables that naturally, i.e. in non-dehydrated form, contain low levels of solids.

By employing the present blend of at least three different vegetables in the indicated amounts, it is ensured that the vegetable powder can be employed in fabricated snacks without imparting a pronounced, recognizable vegetable flavor note. Thus, the present vegetable powder can advantageously be used in e.g. fabricated potato chips to enhance nutritional value and to impart natural color without adversely affecting the typical desirable taste aspects of the potato component.

DETAILED DESCRIPTION OF THE INVENTION

Accordingly, one aspect of the present invention relates to a free flowing vegetable powder comprising an intimate mixture of at least three different dehydrated vegetables that together represent at least 60 wt. % of the vegetable dry matter contained in the powder, said at least three vegetables including:

5-60% of onion by weight of vegetable dry matter;
20-90% by weight of vegetable dry matter of moderately colored vegetable selected from the group consisting of vegetables belonging to the genus *Cucurbita*, vegetables belonging to the genus *Oleracea*, sweet corn, sweet potato, green bean, edamame, celery and combinations thereof; and
5-75% by weight of vegetable dry matter of intensely colored vegetable selected from the group consisting of tomato, red bell pepper, red beet, radicchio, swiss chard, rhubarb, peppers, yam, Adzuki beans, carrot, green pea, green bell pepper, asparagus, spinach, Brussels sprouts, kale, egg plant and combinations thereof;

said free flowing powder further being characterized by a moisture content of less than 10 wt. % and a mass weighted average particle size within the range of 10-500 microns, preferably of 20-400 microns.

The term 'vegetable' as used herein encompasses all parts of plants eaten as food by humans, whole or in part. Thus, vegetables can include leaves (e.g. spinach), stems (e.g. asparagus), roots (e.g. carrots), flowers (e.g. broccoli), bulbs (e.g. onion), seeds (e.g. peas and beans) and botanical fruits (e.g. *Cucurbita*).

The term "intimate mixture" as used herein refers to a mixture of solid particles in which particles of different composition are randomly distributed throughout the mixture.

According to a particularly preferred embodiment the free flowing vegetable powder of the present invention has a uniform color distribution, meaning that with the naked eye the powder is perceived as being composed of particles having the same color.

As will be explained below, a vegetable powder having a uniform color distribution may suitably be produced by preparing an aqueous suspension of the three vegetable components and drying the suspension to obtain the present vegetable powder. Accordingly, in a particularly preferred embodiment of the invention the at least three vegetables contained in the vegetable powder have been co-dried. As compared to e.g. dry blended powders, co-dried blends offer the advantage that the particles are more uniform (especially in terms of color), that the taste contribution of the onion component is less pronounced and/or that the powder is less sensitive to particle sorting during shipping and handling.

Unlike powders made by dry blending, the powders obtained by the co-drying route comprise particles that contain substantial levels of water-soluble solids originating from each of the three vegetable starting materials. Consequently, the present vegetable powder typically contains at least 50 wt. %, preferably at least 75 wt. % of particles that are characterized in that each particle contains water soluble solids originating from each of the at least three vegetables, and each these at least three vegetables representing at least 1 wt. %, preferably at least 3 wt. % of the water soluble solids contained within said particles.

As mentioned herein before the vegetable powder of the present invention can suitably be used to deliver a large serving size of vegetables in fabricated snack products. In order to achieve this it is desirable for the vegetable powder to have a high serving size to (dry) weight ratio. Accordingly, in accordance with a particularly advantageous embodiment, 10 grams of the present free flowing vegetable powder represent a (fresh) vegetable serving of at least 50 grams. Even more preferably, 10 grams of the vegetable powder represent a vegetable serving of at least 80 grams and most preferably of at least 100 grams.

The free flowing powder of the present invention preferably has a moisture content of less than 7 wt. %, most preferably of less than 5 wt. %. In particular if the moisture content is below 5 wt. %, the powder can be stored for more than 12 months under ambient conditions (20° C.).

An important benefit of the present invention resides in the fact that the present free flowing vegetable powder can easily be produced in a form that is instantly hydratable. Here the terminology "instantly hydratable" means that within 10 seconds the vegetable powder can be fully dispersed in an adequate amount of water of 80° C. by simple stirring.

It is strongly preferred that the present powder contains not more than a limited amount of particles that are clearly distinguishable by the naked eye as such large particles may adversely affect the appearance or texture of the snack product in which they are used. Accordingly, in a preferred embodiment, less than 5 wt. %, more preferably less than 3 wt. % of the particles contained in the present free flowing vegetable powder have a particle size in excess of 800 microns.

As explained herein before, the present free flowing powder offers the advantage that it can be used as natural coloring agent. Depending especially on the type of intensely colored vegetable used, the color of the vegetable powder may be yellow, orange, red, pink, green or purple. Most preferably, the vegetable powder is yellow, orange or red.

The onion component may be present in the present vegetable powder in a concentration of up to 60% by weight of vegetable dry matter. At high concentrations, onion powder component may impart typical onion-type flavour notes. For certain applications this may be less desirable. Hence, according to a preferred embodiment, the present vegetable powder contains less than 40%, more preferably less than 30% of onion by weight of vegetable dry matter.

The color of the present vegetable powder is derived from colorants that naturally occur in vegetables such as carotenoids, anthocyans and chlorophyll. The intensely colored vegetable in the present vegetable powder impart an intense color shade such as orange, red, green or purple. Examples of vegetables that can be used to impart a red, pink or orange hue include tomato, red bell pepper, red beet, radicchiio, swiss chard, rhubarb, Adzuki beans, carrot and yam. Green pea, green bell pepper, asparagus, spinach, Brussels sprouts and kale can suitably be employed in the vegetable powder to impart a green shade. Egg plant can suitably be used to introduce a purple hue. Since peppers are available in different colors, including red, green and yellow, peppers can be used in the present powder to introduce a variety of shades. According to a particularly preferred embodiment, the intensely colored vegetable is selected from the group consisting of tomato, red bell pepper, red beet, green pea, green bell pepper and combinations thereof.

According to a preferred embodiment the moderately colored vegetable is selected from the group consisting of a vegetable of the genus *Cucurbita*, sweet corn and combinations thereof. Most preferably, moderately colored vegetable is a vegetable belonging to the genus *Cucurbita* (e.g. pumpkin or squash). *Cucurbita* is particularly suitable for use in the present vegetable powder as it can provide a large serving of vegetable without adversely affecting color, taste and texture of the end product. Furthermore, *Cucurbita* vegetables provide substantial levels of nutritionally beneficial components, notably vitamin A, vitamin C, dietary fiber, folate, potassium, manganese and ω-3 polyunsaturated fatty acids.

*Cucurbita* (also sometimes referred to as *Curcubita*) is a genus in the gourd family Cucurbitaceae. It includes species grown for their fruit and edible seeds (the squashes, pumpkins and marrows, and the chilacayote), as well as some species grown only as gourds. Most preferably, *Cucurbita* vegetable employed in accordance with the present invention is selected from pumpkin, squash or a combination of these two vegetables.

The intensely colored vegetable employed in the present vegetable powder is advantageously selected from the group consisting of tomato, red bell pepper, red beet and combinations thereof. These vegetables can suitably be used to produce a red or orange colored vegetable powder containing high levels of natural anti-oxidant (e.g. carotenoid or anthocyanin). In scientific literature a large variety of health enhancing effects have been attributed to these natural anti-oxidants. Examples of other nutritionally beneficial components found in significant levels in these red vegetables include vitamins A, C and K and dietary fiber.

The free flowing vegetable powder of the present invention may advantageously be used to deliver high levels of natural anti-oxidants in fabricated savory snacks. Besides the natural anti-oxidant quercetin (a flavonoid) that is contained in the onion component, the present powder preferably also contains appreciable levels of carotenoid anti-oxidants, notably lycopene and/pr β-carotene. Both lycopene and β-carotene have been associated with the prevention of cancer and cardiovascular disorders.

The present free flowing vegetable powder can also suitably deliver substantial quantities of dietary fiber. Preferably, the dietary fiber content provided by the combination of onion, moderately colored vegetable and intensely colored vegetable exceeds 6% by weight of vegetable dry matter. Even more preferably, the dietary fiber content exceeds 8% by weight of vegetable dry matter. Dietary fiber is the edible parts of plants or analogous carbohydrates that are resistant to digestion and absorption in the human small intestine with complete or partial fermentation in the large intestine. Dietary fiber includes polysaccharides, oligosaccharides, lignin, and associated plant substances. There is general consensus that dietary fibers promote beneficial physiological effects including Taxation, and/or blood cholesterol attenuation, and/or blood glucose attenuation.

According to another advantageous embodiment of the invention, the at least three vegetables include 5-40% of tomato by weight of vegetable dry matter. Tomato is advantageously incorporated in the present vegetable powder to introduce a reddish shade and to provide nutritionally relevant components (e.g. carotenoids). Furthermore, because tomato naturally contain about 95% of water, incorporation of only a small amount of tomato solids equals a relatively large serving size.

One embodiment of the present invention relates to a free flowing vegetable powder wherein the at least three vegetables include:
  5-20% of onion by weight of vegetable dry matter;
  at least 60% of a vegetable belonging to the genus *Cucurbita* by weight of vegetable dry matter; and
  5-35% by weight of dry matter of intensely colored vegetable selected from the group consisting of tomato, red bell pepper, red beet and combinations thereof.

The vegetable powders according to this embodiment are yellow to orange colored. Because *Cucurbita* contains about 91 wt. % of water, the fact that most of the vegetable dry matter is *Cucurbita* dry matter, means that the vegetable powder can advantageously be used to introduce large serving size of vegetables in fabricated snacks. Like tomato and red bell pepper, also *Cucurbita* contains very high levels of nutritionally relevant carotenoids. Thus, the vegetable powder according to this embodiment is an excellent source of natural anti-oxidants such as quercetin (onion), β-carotene (*Cucurbita*) and at least one of lycopene (tomato, red bell pepper) and anthyocyanin (red beet).

Another embodiment of the invention relates to a free flowing vegetable powder wherein the at least three vegetables include:
  5-25% of onion by weight of vegetable dry matter;
  less than 60% of a vegetable belonging to the genus *Cucurbita* by weight of vegetable dry matter; and
  25-75% by weight of dry matter of intensely colored vegetable selected from the group consisting of tomato, red bell pepper, red beet and combinations thereof.

The vegetable powders according to this embodiment are orange to red colored and contain high levels of anti-oxidants in the from of quercetin, β-carotene and at lest one of lycopene and anthocyanin.

Besides the at least three mentioned vegetables, the free flowing vegetable powder of the present invention may suitably contain additional food grade ingredients, such as sugars, hydrocolloids, oil, etc. Preferably, the at least three vegetables together represent at least 60 wt. %, more preferably at least 75% of the dry matter contained in the free flowing powder.

The bulk density of the present free flowing vegetable powder is typically within the range of 0.2-0.7 g/cm³. Preferably, said bulk density is within the range of 0.25-0.5 g/cm³.

The present vegetable powder is especially suited for use in fabricated savory snacks that are produced by baking or frying a farinaceous dough composition. In order to deliver a sizeable amount of vegetable serving and nutritionally beneficial components, the present vegetable powder is advantageously distributed throughout the dough composition before baking or frying. Although the present vegetable powder might, in principle, also be applied as a seasoning mix on the outside of the dough composition or on the outside of the baked or fried snack, this is not the intended use of the vegetable powder. Thus, unlike seasoning, the present powder preferably does not contain substantial levels of salt. Typically, in the present vegetable powder sodium represents less than 1%, preferably less than 0.1% by weight of dry matter.

Another aspect of the present invention relates to a process of manufacturing a free flowing vegetable powder as defined herein before, said process comprising the steps of:
  combining onion, moderately colored vegetable, intensely colored vegetable and optionally other ingredients to prepare an aqueous blend having a solids content of 10-40 wt. %;
  intimately mixing the resulting blend to produce a homogeneous mixture; and
  drying the homogeneous mixture.

In the present process the individual vegetable components may be introduced into the aqueous blend in the form of fresh vegetables, vegetable puree, vegetable paste or vegetable powder. According to a particularly preferred embodiment, onion is added in the form of a powder, notably a powder having a moisture content of less than 10 wt. %, especially of less than 5 wt. %.

According to a particularly preferred embodiment of the present process the drying of the homogeneous mixture includes drum drying. Drum drying offers the advantage that it produces a relatively bland tasting dry powder as the drying conditions are sufficiently mild to minimize heat-induced flavor generating reactions, such as Maillard reactions and oxidation reactions.

The inventions is further illustrated by means of the following examples.

EXAMPLES

Example 1

A vegetable powder that can suitably be applied at approximately 16 wt. % (based on final product) in a sheeted potato chip to deliver yellow color, nutritionally beneficial components, bland taste and the equivalent of 170 g of fresh vegetables per 100 g of chips, was prepared by blending pumpkin puree (13.5 wt. % dry solids); onion powder (95 wt. % dry solids) and tomato paste (34.5 wt. % dry solids).

The vegetable powder was prepared by first producing a smooth vegetable puree as follows:

To an agitated steam jacketed kettle, while agitating, 286 kg (630 lbs) of pumpkin puree were added and heated to 85° C. (185° F.), following which the steam was turned off;
  Next, 17.0 kg (37.5 lbs) of onion powder were added, using slow agitation, for 20 minutes. Temperature was maintained at minimum 74° C. (165° F.) by using additional steam as necessary.
  An additional 612 kg (1350 lbs) of pumpkin puree and 52 kg (114.6 lbs) of tomato paste were added under agitation.
  The mixture of pumpkin, onion and tomato was pureed until smooth using a grinder
  The smooth vegetable puree so obtained was transferred to the drying process
  Subsequently, the vegetable puree was dried on double drum dryers with the following settings:
  45 psi steam pressure (range 30 to 60 psi)
  Nip (distance between the drums)—approx. 0.02 inches (range 0.010 to 0.035 inches)
  2 rpm drum rotation speed (range −1.25 to 4 rpm)
  Finished moisture target 3%

The processing parameters may be adjusted within the indicated ranges as needed to maintain finished product moisture, color and flavor within acceptable limits.

The powder so obtained had a yellow/orange color and a moisture content of 3 wt. %. The powder had a bulk density of about 0.35 g/cm³, was free flowing and instantly hydratable. Furthermore, after packaging in a heat sealed liner with oxygen and moisture barrier properties, the powder had excellent (>12 months) storage stability under ambient conditions.

The nutritional profile of the vegetable powder is summarized in the following table:

| NUTRITIONAL COMPONENT | CONTENT PER 100 GRAM OF POWDER |
|---|---|
| Carbohydrates | 81 |
| Dietary fiber | 13 |
| Protein | 11 |
| Fat | 1 |
| Vitamins | |
| vitamin A | 1075 IU |
| vitamin B6 | 1.3 mg |
| vitamin C | 10 mg |
| vitamin E | 0.9 mg |
| Minerals | |
| Calcium | 240 mg |
| Iron | 5.5 mg |
| Magnesium | 115 mg |
| Phosphorus | 203 mg |
| Potassium | 2700 mg |
| Sodium | 62 mg |
| Zinc | 1.8 mg |

Example 2

A green vegetable powder that is suitable for use in fabricated savory snacks was produced by combining the vegetables listed in the following table in the indicated amounts:

| Vegetable | Dry solids content | % by weight of vegetable dry matter |
|---|---|---|
| Onion powder | 95 | 15 |
| Green bean puree | 9.7 | 30 |
| Zucchini powder | 95 | 20 |
| Celery powder | 91 | 10 |
| Green pea puree | 21 | 10 |
| Green bell pepper powder | 98 | 15 |

The vegetable powder was prepared by first producing a smooth vegetable puree as follows:

To an agitated steam jacketed kettle, 475.8 kg (1049 lb) of water were added and heated to 82° C. (180° F.), following which the steam was turned off; 17.8 kg (40 lb) of onion powder were added using slow agitation for 20 minutes.

Next, the remaining vegetables were added: 333.3 kg (734.7 lb) green beans; 45.4 kg (100 lb) of green peas; 12.1 kg (26.7 lb) of celery powder; 403.2 kg (888.9 lb) of zucchini; 18.1 kg (40 lb) green bell pepper powder.

The mixture of green beans, onion powder, zucchini, green peas, celery powder and green bell pepper powder was pureed until smooth using a grinder.

The smooth vegetable puree so obtained was transferred to the drying process

Subsequently, the vegetable puree was dried on double drum dryers with the following settings:

45 psi steam pressure (range 30 to 60 psi)
Nip (distance between the drums)—approx. 0.02 inches (range 0.010 to 0.035 inches)
2 rpm drum rotation speed (range −1.25 to 4 rpm)
Finished moisture target 3%

The processing parameters may be adjusted within the indicated ranges as needed to maintain finished product moisture, color and flavor within acceptable limits.

The vegetable powder so obtained contained a variety of nutritionally beneficial components, had a moisture content of 3 wt. %, was free flowing and instantly hydratable. The powder had a bland taste and 100 g of the green powder represented 1291 g of fresh vegetables. After packaging in a heat sealed liner with oxygen and moisture barrier properties, the powder can be stored for more than 12 months under ambient conditions without any problems.

The nutritional profile of the vegetable powder is summarised in the following table:

| NUTRITIONAL COMPONENT | CONTENT PER 100 GRAM OF POWDER |
|---|---|
| Carbohydrates | 70.7 g |
| Dietary fiber | 20.1 g |
| Protein | 17.2 g |
| Fat | 2.1 g |
| Vitamins | |
| vitamin A | 4203.9 IU |
| vitamin B6 | 1 mg |
| vitamin C | 357 mg |
| vitamin E | 1.8 mg |
| Minerals | |
| Calcium | 339.3 mg |
| Iron | 7.9 mg |
| Magnesium | 194.1 mg |
| Phosphorus | 377.4 mg |
| Potassium | 2526.3 mg |
| Sodium | 258.4 mg |
| Zinc | 2.9 mg |

Example 3

A vegetable powder that can suitably be used in fabricated savory snacks to deliver nutritionally beneficial components and to impart an orange color, was produced by combining the vegetables listed in the following table in the indicated amounts:

| Vegetable | Dry solids content | % by weight of vegetable dry matter |
|---|---|---|
| Onion powder | 95 | 9 |
| Pumpkin puree | 13.5 | 66 |
| Tomato paste | 34.5 | 10 |
| Red bell pepper powder | 95 | 15 |
| Duralox ™ AMN-2 (ex Kalsec) | | 1 |

The vegetable powder was prepared by first producing a smooth vegetable puree as follows:

To an agitated steam jacketed kettle, while agitating, 221 kg (488 lbs) of pumpkin puree were added and heated to 85° C. (185° F.), following which the steam was turned off;

Next, 30.7 kg (67.8 lbs) of onion powder were added, using slow agitation, for 20 minutes. Temperature was maintained at minimum 74° C. (165° F.) by using additional steam as necessary.

An additional 487 kg (1074 lbs) of pumpkin puree, 18.5 kg (41 lbs) of red bell pepper powder, 249 kg (550 lbs) of tomato paste, 6.4 kg (14.1 lbs) of red beet juice concentrate, and 0.68 kg (1.5 lbs) of an antioxidant (Duralox AMN-2) were added under agitation.

The mixture of pumpkin, onion, tomato, red bell pepper powder, red beet juice concentrate, and antioxidant was pureed until smooth using a grinder The smooth vegetable puree so obtained was transferred to the drying process Subsequently, the vegetable puree was dried on double drum dryers with the following settings:

45 psi steam pressure (range 30 to 60 psi)
Nip (distance between the drums)—approx. 0.02 inches (range 0.010 to 0.035 inches)
2.6 rpm drum rotation speed (range −1.25 to 4 rpm)
Finished moisture target 3%

The processing parameters may be adjusted within the indicated ranges as needed to maintain finished product moisture, color and flavor within acceptable limits.

The vegetable powder so obtained contained a variety of nutritionally beneficial components, had a moisture content of 3 wt. %, was free flowing and instantly hydratable. The powder had a bland taste and 100 g of the green powder represented 1257 g of fresh vegetables. After packaging in a heat sealed liner with oxygen and moisture barrier properties, the powder can be stored for more than 12 months under ambient conditions without any problems.

The nutritional profile of the vegetable powder is summarized in the following table:

| NUTRITIONAL COMPONENT | CONTENT PER 100 GRAM OF POWDER |
|---|---|
| Carbohydrates | 76. g |
| Dietary fiber | 14. g |
| Protein | 11 g |
| Fat | 1.3 g |
| Vitamins | |
| vitamin A | 120,087 IU |
| vitamin B6 | 0.86 mg |
| vitamin C | 370 mg |
| vitamin E | 6.2 mg |
| Minerals | |
| Calcium | 227 mg |
| Iron | 1.0 mg |
| Magnesium | 187 mg |
| Phosphorus | 417 mg |
| Potassium | 2953 mg |
| Sodium | 33 mg |
| Zinc | 2.1 mg |

Example 4

A red vegetable powder that is suitable for use in fabricated savory snacks was produced by combining the vegetables listed in the following table in the indicated amounts:

| Vegetable | Dry solids content | % by weight of vegetable dry matter |
|---|---|---|
| Onion | 95 | 12.5 |
| Pumpkin puree | 13.5 | 40.1 |
| Tomato paste | 34.5 | 38.1 |
| Red bell pepper powder | 95 | 7.5 |
| Red beet juice concentrate | 64 | 1.8 |
| Duralox AMIN-2 | | 0.3 |

The vegetable powder was prepared by first producing a smooth vegetable puree as follows:

To an agitated steam jacketed kettle, while agitating, 221 kg (488 lbs) of pumpkin puree were added and heated to 85° C. (185° F.), following which the steam was turned off;

Next, 30.7 kg (67.8 lbs) of onion powder were added, using slow agitation, for 20 minutes. Temperature was maintained at minimum 74° C. (165° F.) by using additional steam as necessary.

An additional 487 kg (1074 lbs) of pumpkin puree, 18.5 kg (41 lbs) of red bell pepper powder, 249 kg (550 lbs) of tomato paste, 6.4 kg (14.1 lbs) of red beet juice concentrate, and 0.68 kg (1.5 lbs) of an antioxidant (Duralox AMN-2) were added under agitation.

The mixture of pumpkin, onion, tomato, red bell pepper powder, red beet juice concentrate, and antioxidant was pureed until smooth using a grinder The smooth vegetable puree so obtained was transferred to the drying process Subsequently, the vegetable puree was dried on double drum dryers with the following settings:

45 psi steam pressure (range 30 to 60 psi)
Nip (distance between the drums)—approx. 0.02 inches (range 0.010 to 0.035 inches)
2.6 rpm drum rotation speed (range −1.25 to 4 rpm)
Finished moisture target 3%

The processing parameters may be adjusted within the indicated ranges as needed to maintain finished product moisture, color and flavor within acceptable limits.

The vegetable powder so obtained contained a variety of nutritionally beneficial components, had a moisture content of 3 wt. %, was free flowing and instantly hydratable. The powder had a bland taste and 100 g of the green powder represented 1362 g of fresh vegetables. After packaging in a heat sealed liner with oxygen and moisture barrier properties, the powder can be stored for more than 12 months under ambient conditions without any problems.

The nutritional profile of the vegetable powder is summarized in the following table:

| NUTRITIONAL COMPONENT | CONTENT PER 100 GRAM OF POWDER |
|---|---|
| Carbohydrates | 58. g |
| Dietary fiber | 10. g |
| Protein | 10 g |
| Fat | 1.4 g |
| Vitamins | |
| vitamin A | 19760 IU |
| vitamin B6 | 0.58 mg |
| vitamin C | 68 mg |
| vitamin E | 7.7 mg |
| Minerals | |
| Calcium | 158 mg |
| Iron | 6.5 mg |
| Magnesium | 97 mg |
| Phosphorus | 268 mg |
| Potassium | 2100 mg |
| Sodium | 144 mg |
| Zinc | 1.8 mg |

The invention claimed is:

1. A process of manufacturing a free flowing vegetable powder the process comprising:
   combining at least three different vegetables comprising onion, moderately colored vegetable and intensely colored vegetable to prepare an aqueous blend having a solids content of 10-40 wt. %;
   intimately mixing the aqueous blend of vegetables to produce a homogeneous mixture; and
   drying the homogeneous mixture to obtain the free flowing vegetable powder,
   wherein the vegetable content of the powder comprises:
   5-60% by weight of onion;
   20-90% by weight of one or more moderately colored vegetable selected from the group consisting of vegetables belonging to the genus *Cucurbita*, vegetables belonging to the genus *Oleracea*, sweet corn, sweet potato, green bean, edamame, celery and combinations thereof; and
   5-75% by weight of one or more intensely colored vegetable selected from the group consisting of tomato, red bell pepper, red beet, radicchio, swiss chard, rhubarb, peppers, yam, Adzuki beans, carrot, green pea, green bell pepper, asparagus, spinach, Brussels sprouts, kale, egg plant and combinations thereof, and
   wherein the vegetables together represent at least 60 wt. % of the total vegetable dry matter in the powder.

2. The process according to claim 1, wherein said onion comprises onion powder having a moisture content of less than 10 wt. %.

3. The process according to claim 1, wherein the drying of the homogeneous mixture includes drum drying.

4. The process according to claim 1, wherein the free flowing vegetable powder comprises particles that contain water-soluble solids originating from each of the at least three different vegetables.

* * * * *